(12) United States Patent
Janssen et al.

(10) Patent No.: US 11,539,549 B2
(45) Date of Patent: Dec. 27, 2022

(54) DATA TRANSMISSION METHOD, DATA STRUCTURE, AUTOMATION NETWORK AND UNLOCKER

(71) Applicant: Beckhoff Automation GmbH, Verl (DE)

(72) Inventors: Dirk Janssen, Verl (DE); Florian Essler, Nuremberg (DE); Guido Beckmann, Verl (DE); Hans Beckhoff, Verl (DE); Holger Büttner, Berlin (DE); Martin Rostan, Nuremberg (DE); Thomas Rettig, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/144,694

(22) Filed: Jan. 8, 2021

(65) Prior Publication Data

US 2021/0135900 A1 May 6, 2021

Related U.S. Application Data

(63) Continuation of application No. PCT/EP2020/057460, filed on Mar. 18, 2020.

(30) Foreign Application Priority Data

May 28, 2019 (DE) ...................... 10 2019 114 305.5

(51) Int. Cl.
*H04L 12/40* (2006.01)
(52) U.S. Cl.
CPC .................. *H04L 12/40019* (2013.01); *H04L 2012/4026* (2013.01)

(58) Field of Classification Search
CPC ............. H04L 2012/4026; H04L 12/40; H04L 12/40019
See application file for complete search history.

(56) References Cited

U.S. PATENT DOCUMENTS

2002/0163920 A1* 11/2002 Walker .................. H04L 63/164
370/401
2008/0137557 A1* 6/2008 Nozue ..................... H04L 45/00
370/256

(Continued)

FOREIGN PATENT DOCUMENTS

| CN | 101132328 | 2/2008 |
|----|-----------|--------|
| CN | 101197751 A | 6/2008 |

(Continued)

OTHER PUBLICATIONS

Examination Report dated Dec. 19, 2019 in connection with German Patent Application No. DE 10 2019 114 305.5, 16 pages including English translation.

(Continued)

*Primary Examiner* — Stephen J Clawson
(74) *Attorney, Agent, or Firm* — Dorsey & Whitney LLP (57) ABSTRACT

A method for transmitting data in an automation network by telegrams, where the automation network comprises a master subscriber, slave subscribers and at least one unlocker, connected to each other via a data-line network. The slave subscribers are divided into segments. The master subscriber sends locked telegrams for processing by the slave subscribers, each having a telegram identifier used to assign a locked telegram to a segment. At least one segment is assigned to at least one unlocker. If the unlocker receives a locked telegram, the unlocker checks, by the telegram identifier in the locked telegram, whether the locked telegram for the assigned segment is intended to release the locked telegram, as an unlocked telegram for processing by the slave sub- (Continued)

scribers, provided that the locked telegram is intended for the segment assigned to the unlocker.

18 Claims, 3 Drawing Sheets

(56) References Cited

U.S. PATENT DOCUMENTS

| | | | | |
|---|---|---|---|---|
| 2009/0067445 | A1* | 3/2009 | Diguet | H04L 45/06 370/419 |
| 2010/0241773 | A1* | 9/2010 | Rostan | H04L 12/403 710/110 |
| 2011/0283027 | A1 | 11/2011 | Buesching et al. | |
| 2012/0254376 | A1* | 10/2012 | Bumstead | H04L 41/0806 709/220 |
| 2013/0208724 | A1* | 8/2013 | Colucci | H04L 12/413 370/392 |
| 2017/0111293 | A1 | 4/2017 | Poledna | |
| 2017/0171096 | A1 | 6/2017 | Bunte et al. | |

FOREIGN PATENT DOCUMENTS

| | | |
|---|---|---|
| CN | 102339047 A | 2/2012 |
| CN | 106576064 A | 4/2017 |
| DE | 102010020446 A1 | 11/2011 |
| DE | 102014108457.8 B3 | 1/2016 |
| DE | 102014112082 A1 | 2/2016 |
| EP | 0887970 A2 | 12/1998 |
| EP | 3157201 A1 | 4/2017 |

OTHER PUBLICATIONS

International Search Report and Written Opinion dated Jun. 9, 2020 in connection with International Patent Application No. PCT/EP2020/057460, 29 pages including English translation.

"EtherCAT for factory networking," PC Control 04 (2009) obtained from <https://www.ethercat.org/en/downloads/downloads_8A145EAB9B0A4B4CB3292E23EF04E9D7.htm>, 4 pages.

Office Action issued in Chinese Patent Application No. 202080004370.6, dated Mar. 16, 2022.

* cited by examiner

DATA TRANSMISSION METHOD, DATA STRUCTURE, AUTOMATION NETWORK AND UNLOCKER

CROSS-REFERENCE TO RELATED APPLICATIONS

This is a continuation of International Patent Application PCT/EP2020/057460, filed 18 Mar. 2020, DATA TRANSMISSION METHOD, DATA STRUCTURE, AUTOMATION NETWORK AND UNBLOCKER, and claims priority to German Patent Application DE 10 2019 114305.5, filed 28 May 2019, DATENÜBERTRAGUNGSVERFAHREN, DATENSTRUKTUR, AUTOMATISIERUNGSNETZWERK UND ENTSPERRER, each of which is incorporated by reference herein, in the entirety and for all purposes.

FIELD

The present invention relates to a method for transmitting data in an automation network and an associated automation network. The present invention further relates to a data structure for use in the method for transmitting data and to an unlocker which is embodied to carry out the method for transmitting data and to use the data structure.

BACKGROUND

Automation networks are frequently operated as what is referred to as "field-bus systems". Field-bus systems are industrial bus systems that enable real-time control of the machines or systems of the automation network. Usually, the machines or plants of the automation network are controlled by programmable logic controllers (PLC). The PLC uses the field-bus system for communication between the field devices, such as sensors and actuators of the machines or plants of the automation network and the PLC. If a plurality of communication subscribers send telegrams via the same data line, which may be embodied as a wired or wireless bus system, it must be defined which communication subscriber "may have a say" in what (provide measured values, execute commands and, for example, process subtasks, etc.) and when. For this purpose, defined hierarchies and standardized data transmission protocols are provided.

Usually the field-bus systems operate in what is referred to as "master-slave mode". This means that the master subscriber takes over the control of the processes while the slave subscribers handle the execution of subtasks in the control mode of the automation network. Data is exchanged in the automation network by telegrams that are issued by the master subscriber to the slave subscribers. The slave subscribers read the output data addressed to them from the telegram and place their input data into the telegram and send the telegram back to the master subscriber.

In automation networks in which data traffic is carried out by telegrams with the underlying EtherCAT-data-transfer protocol, hereinafter referred to as EtherCAT networks, the telegrams are routed through all slave subscribers and, in the case of a chain of slave subscribers being connected to a data line, the telegrams are sent back from the last slave subscriber to the master subscriber. In this context, routing refers to the definition of transmission paths for the transmission of telegrams in the automation network. The disadvantage of such an EtherCAT network is that the telegrams are always passed through and processed by all slave subscribers, i.e. each slave subscriber reads the output data of the telegram addressed to it on the fly and places its input data into the telegram before the slave subscriber forwards the telegram. Herein, sending a telegram from a slave in an EtherCAT network is equivalent to entering information in-to the telegram sent by the master-network subscriber and forwarding the telegram to a slave subscriber following in the direction of the telegram, as a slave subscriber in an EtherCAT network does not send any acknowledgement or response telegrams on request of the master subscriber. In a conventional EtherCAT network, there is thus no possibility of activating telegrams for specific segments by slave subscribers, i.e. of releasing the telegrams for the specific segments for processing by the slave subscribers, while the telegrams for the non-addressed slave subscribers in a segment are locked for processing.

SUMMARY

The present invention provides a method for transmitting data by telegrams enabling a segment to be specifically addressed by slave subscribers. Furthermore, the present invention provides an increased confidentiality of data transmission in an automation network by an improved data structure and provides an improved automation network.

EXAMPLES

According to a first aspect, a method for transmitting data in an automation network by telegrams is provided. The automation network comprises a master subscriber, slave subscribers and at least one unlocker connected to each other via a data-line network. The slave subscribers are divided up into segments, each segment comprising at least one slave subscriber, wherein the master subscriber sends locked telegrams for processing by the slave subscribers, each telegram having a telegram identifier in order to assign a locked telegram to a segment. At least one segment is assigned to the at least one unlocker. When the at least one unlocker receives a locked telegram, the at least one unlocker checks on the basis of the telegram identifier in the locked telegram whether the locked telegram for the segment assigned to the at least one unlocker is intended to release the locked telegram as an unlocked telegram for processing by the slave subscribers, provided that the locked telegram is intended for the segment assigned to the at least one unlocker.

According to a second aspect, an automation network is provided. The automation network comprises a master subscriber, slave subscribers and at least one unlocker connected to each other via a data-line network. The slave subscribers are divided up into segments, each segment comprising at least one slave subscriber, wherein the master subscriber is embodied to send telegrams locked for processing by the slave subscribers, each telegram having a telegram identifier for assigning a locked telegram to a segment. At least one segment is assigned to the at least one unlocker. The at least one unlocker is embodied, if the at least one unlocker receives a locked telegram, to check on the basis of the telegram identifier in the locked telegram whether the locked telegram for the segment assigned to the at least one unlocker is intended to release the locked telegram as an unlocked telegram for processing by the slave subscribers, provided that the locked telegram is intended for the segment assigned to the at least one unlocker.

According to a third aspect, an unlocker for an automation network is provided. The automation network comprises a master subscriber, slave subscribers and the unlocker, connected to each other via a data-line network. The slave subscribers are divided up into segments, each segment comprising at least one slave subscriber, wherein the master subscriber is embodied to send telegrams locked for processing by the slave subscribers, each telegram having a telegram identifier for assigning a locked telegram to a segment. The unlocker is being embodied to carry out a method for transmitting data and to use a data structure according to claim 8 in the method. The method comprises, when the at least one unlocker receives a locked telegram, the at least one unlocker checks on the basis of the telegram identifier in the locked telegram whether the locked telegram for the segment assigned to the at least one unlocker is intended to release the locked telegram as an unlocked telegram for processing by the slave subscribers, provided that the locked telegram is intended for the segment assigned to the at least one unlocker.

BRIEF DESCRIPTION OF THE DRAWINGS

The above-described properties, features and advantages of the present invention as well as the way in which these are achieved become clearer and more understandable in connection with the following description of examples of implementation which are explained in more detail in connection with the schematic drawings, in which.

DETAILED DESCRIPTION

It is pointed out that the figures are only schematic in nature and not true to scale. In this sense, components and elements shown in the figures may be oversized or scaled down for better understanding. Furthermore, it is pointed out that the reference signs in the figures have not been changed if the elements and/or components and/or sizes are the same.

Automation networks are usually realized as field-bus systems in which the network subscribers are connected via the field bus. The network subscribers may be embodied as a master subscriber, as a plurality of slave subscribers and as at least one unlocker, if the access authorization for the field-bus system is based on the master-slave hierarchy. The mentioned network subscribers may be embodied to exchange data with control units, wherein real-time capable data transfer protocols such as the EtherCAT-data-transfer protocol are usually used. In addition, the automation network may also comprise network subscribers that may process other data transfer protocols such as TCP/IP (TCP/IP: Transmission Control Protocol/Internet Protocol), Ethernet, etc. These network subscribers do not have to be addressed for control tasks. For example, this data-transmission-protocol data may include diagnostic information about the automation network. The present proposal is explained below using the real-time capable EtherCAT-data-transmission protocol as an example.

The above mentioned network subscribers connected via the data-line network in the automation network may be interconnected via network distributors, so-called "switches" or "branches". The network distributors also serve to coordinate the data exchange of the subscribers in the segments and to route the telegrams to their destination at the right time. In automation networks in which data traffic is carried out by telegrams with the underlying EtherCAT-data-transfer protocol, hereinafter referred to as EtherCAT networks, the telegrams are passed through all slave subscribers and, in the case of a chain of slave subscribers connected to a data line, are sent back to the master subscriber by the last slave subscriber. A targeted addressing of individual segments by slave subscribers using EtherCAT telegrams has not been realized so far.

The core idea of the present proposal lies in the targeted release of the EtherCAT telegrams for processing by the slave subscribers in a segment and in the possibility of disabling the EtherCAT telegrams for processing on the way to the segment with slave subscribers to be addressed by the telegram for non-addressed segments with slave subscribers. However, the proposal is not limited to the EtherCAT-data-transfer protocol and may be used in all automation networks in which the telegrams are always passed through all slave subscribers.

It is proposed a method for transmitting data in an automation network by telegrams and an associated automation network. The automation network comprises a master subscriber, slave subscribers and at least one unlocker which are connected to each other via a data-line network. Furthermore, the slave subscribers are divided up into segments, each segment comprising at least one slave subscriber. The master subscriber sends telegrams locked for processing by the slave subscribers, each of which has a telegram identifier, to assign a locked telegram to a segment. At least one segment is assigned to at least one unlocker. If the at least one unlocker receives a locked telegram, the at least one unlocker checks on the basis of the telegram identifier in the locked telegram whether the locked telegram is intended for the segment assigned to the at least one unlocker in order to release the locked telegram as an unlocked telegram for processing by the slave subscribers, provided that the locked telegram is intended for the segment assigned to the at least one unlocker.

The proposed method for transmitting data provides the possibility of releasing the telegrams for processing specifically for the slave subscribers in a segment, e.g. an arrangement of slave subscribers in a linear chain. By specifically releasing the telegrams for processing by the slave subscribers in a segment, faster runtimes of the telegrams in the automation network may be provided. In this context, the run time comprises transmitting the telegram via a data line, a delay time resulting from a hardware run-through time, i.e. the run-through time by the individual slave subscribers, and receipt via the data line. In particular, this procedure may be used to reduce the delay time for the individual slave subscribers in a segment, which are not to be addressed by the telegram, because the slave subscribers only have to check in the telegram if there is an addressing of the slave subscriber in the segment and if the check result is negative, no readout of output data from the telegram and no insertion of input data into the telegram by the slave subscribers of a segment, which are not addressed in the telegram, takes place.

This method may be used to mask telegrams, i.e., to hide the actual user data of the telegrams for slave subscribers which are not to be addressed by the telegrams. Blocking the processing of the telegrams for slave subscribers may thus improve information security in the automation network and provide a higher level of confidentiality during data transmission. The proposed method is not limited to the EtherCAT-data-transfer protocol for the telegrams, but may also be implemented for other data-transfer protocols and automation networks in which it is only possible to address all slave subscribers by the telegrams.

In a further embodiment, the telegrams each comprise a data field having a data element. If the telegrams are locked, the data element comprises a first value. If the telegrams are, however, unlocked, the data element has a second value. When a locked telegram is unlocked, the at least one unlocker sets the first value of the data element to the second value of the data element to indicate to the slave subscribers that the telegram is released for processing.

If, for example, a machine or system in the automation network is to be accessed from any point in a factory or if the machine or system is to be accessed from home, a security mechanism has to be created to counter the risk of unauthorized access to the machine or system and, if necessary, the associated manipulation of the automation network. In this context, for example, an encrypted connection may be established for transmitting data to each slave subscriber in the automation network, wherein, however, each slave subscriber must support the encryption. If only one data transmission protocol is used in the entire automation network, both for an external connection for the Internet and locally for the control of the machines or systems of the automation network, this also requires a local encryption of the machine or system control and thus of the telegrams for data transmission, which may e.g. be embodied as EtherCAT telegrams. With the proposed method, faster telegram transmission may be provided in comparison to an encryption of the telegrams, since the telegram transmission of an encrypted telegram and the associated decryption of the telegram are more time-consuming than setting the first value of the data element to the second value of the data element of the at least one unlocker in order to unlock the telegram for processing by the slave subscribers.

The method may also be used to advantage when different data transfer protocols are implemented in the automation network. For example, the EtherCAT-data-transfer protocol may be used for controlling the machines or systems of the automation network, and herein segments may be specifically addressed with the Ether-CAT telegrams for control tasks, and a data-transfer protocol differing therefrom may be used for accessing the machines or systems of the automation network, wherein access may be limited to reading diagnostic data, such as operating temperatures of the machines or systems of the automation network, etc.

According to a further embodiment, the master subscriber sends a configuration telegram to the at least one unlocker before sending the telegrams, which indicates to the at least one unlocker the telegram identifier of the segment assigned to the at least one unlocker. The configuration telegram may be sent once before the telegrams are sent, i.e. prior to the telegram traffic for the control operation of the automation network, or it may be sent dynamically in a time window during which the automation network is not in control operation in order to avoid possible problems when sending the configuration telegram in control operation. With the at least one unlocker in the automation network, the data-transmission method may be easily implemented in the automation network. Due to the fast configuration of the at least one unlocker by a configuration telegram the time and effort involved in implementing the method is low. For example, in addition to displaying the telegram identifier of the segment assigned to the at least one unlocker, the configuration telegram may also be used to set that the at least one unlocker for the segment with the telegram identifier assigned to the at least one unlocker sets the first value of the data element to the second value of the data element when the at least one unlocker receives a locked telegram having the telegram identifier and the first value of the data element, and the at least one unlocker then outputs the unlocked telegram to the segment assigned to it. With the configuration telegram, it is possible to assign the telegram identifier to a segment and, by using the at least one unlocker, a fast and simple release of the telegrams for processing by the slave subscribers in a segment may be provided.

In a further embodiment, the data-line network comprises data connections between the master subscriber, the slave subscribers and a plurality of unlockers. If an unlocker receives an unlocked telegram from a preceding unlocker via a data connection that is not intended for the segment assigned to the unlocker, the unlocker locks the telegram. In particular, the proposed method is not limited to unlocking a locked telegram by the unlocker, but the unlocker may also be flexibly set for locking a telegram. This is particularly conceivable if the unlocker receives an unlocked telegram from another, preceding unlocker, which may be located before the unlocker e.g. in the reverse direction of the telegram to the master subscriber and the telegram is not intended for the segment assigned to the unlocker and processing of the unlocked telegram by the slave subscribers along the reverse direction of the telegram is not excluded. Alternatively, the unlocker may also lock a telegram that the unlocker has received from a previous unlocker in telegram-forward direction starting from the master subscriber and that is not intended for the segment assigned to the unlocker.

According to another embodiment, the data-line network comprises data connections between the master subscriber, the slave subscribers and a plurality of unlockers, wherein the data connections each have a forward line and a return line. The slave subscribers each process the telegrams on the forward line of the data connection. If an unlocker receives an unlocked telegram from a preceding unlocker via a forward-data connection, the unlocker sends the unlocked telegram to the master subscriber via a return-data connection. In particular an automation network embodied as an EtherCAT network may comprise data connections which may be embodied as data lines, each of which having a forward line (TX line, TX: transmitter) for sending the telegrams from the master subscriber and a return line (RX line, RX: receiver) for receiving the telegrams from the master subscriber. In this context, it may be provided that the telegrams are processed by the slave subscribers only on the forward line of the data connection or, respectively, data line, and the telegrams are sent to the master subscriber by the slave subscribers on the return line without processing.

The unlocker may be configured in the EtherCAT network in such a way that the unlocker recognizes on receipt of an unlocked telegram from another unlocker preceding on the data connection or, respectively, data line that the telegram has already been processed by the slave subscribers and, for example, due to the telegram identifier no further processing of the telegram on the forward line is planned, so that the unlocker may send the unlocked telegram directly to the master subscriber via the return line.

In a further embodiment, the at least one unlocker is embodied as a network distributor and has a plurality of input/output ports to which segments comprising slave subscribers are connected. The at least one unlocker embodied as a network distributor uses the telegram identifier for routing the telegram through the multiple input/output ports of the at least one unlocker embodied as a network distributor.

If the unlocker is embodied as a network distributor, the functions of a network distributor may be utilized in an advantageous manner, e.g. the different modes of operation of the network distributor, such as store-and-forward, cut-through, etc. Also, the unlocker embodied as a network distributor may be embodied to fragment the telegrams to avoid collision of the telegrams sent back from the slave subscribers to the master subscriber. If the unlocker is embodied as a network distributor, the telegram identifier may advantageously be used for routing telegrams through the individual input/output ports of the network distributor to allow for a quick assignment of the individual input/output ports of the network distributor to the telegram identifiers for the segments. The embodiment of the unlocker as a network distributor is particularly conceivable if the network topology underlying the automation network is embodied as a tree structure or as a comparable branched structure and favors a branching of the unlocker with a plurality of input/output ports. In contrast thereto, the unlocker in a line or ring topology may e.g. cover two input/output ports, wherein an input/output port may be embodied as input port and an input/output port as output port. Due to the lack of branching, it may e.g. not be required in an automation network embodied in this way that the unlocker be embodied as a network distributor.

According to a further embodiment, the at least one unlocker is additionally embodied as a slave subscriber to also process the telegram. This offers the possibility of cost savings since no additional network component has to be used, but the unlocker may specifically release telegrams for processing by the slave subscribers in a segment and may itself be involved in telegram processing as a slave subscriber.

A data structure is moreover proposed for use in a method. The data structure is embodied as a telegram, and the telegram has a header section, a data section and an end section. The header section comprises the telegram identifier. The data section contains the data field with the data element. The data element comprises the first value if the telegram is locked. The data element comprises the second value if the telegram is unlocked. The end section includes a checksum field for an integrity check of transmitted data. As the telegram identifier for assigning the telegrams to the segments and the data field comprising the data element indicating that the processing of the telegram is disabled or enabled for the slaves is contained in the header section of the telegram, this information may be processed quickly by the slave subscribers and the telegrams may be forwarded quickly to a subsequent slave subscriber if it is determined that the data element contains the first value indicating that the telegram is disabled for processing. The telegram traffic in control mode is not delayed by the unlocking or locking of the telegrams by the unlockers due to the proposed embodiment of the telegrams.

In a further embodiment, the telegram is embodied as an Ethernet telegram with a target-address field and a sender-address field in the header section. The target-address field and the sender-address field are each embodied as MAC-address field (MAC: Media Access Control). The header section includes a TAG field that contains the telegram identifier. Furthermore, the header section has a protocol field for a used protocol. The telegram uses the known Ethernet-data-frame structure, i.e. the specific format for packet-oriented data transmission according to the IEEE standard 802.3. Thus, an improved compatibility with other systems, which also support the standardized packet transmission, may be provided with the proposed procedure using the proposed data structure.

According to another embodiment the telegram is embodied as an EtherCAT telegram. The data section comprises a further header section, wherein the further header section has a length field, a reserve field and the data field. The data field is a type field and the data element is an EtherCAT-protocol type. The telegram may be embodied as an EtherCAT telegram and use the proven real-time capable EtherCAT-data-transmission protocol. The EtherCAT-protocol type of the type field comprises the second value which by default with the value one (in the hexadecimal-system representation) indicates the release of the telegram for processing, i.e. an addressing of the slave subscribers of a segment. The type field may be embodied as a 4-bit field, thus allowing for the representation of 16 different protocol types ($2^4=16$) and thus allowing for the use of another protocol type value to disable the processing of the telegram. The further value of the protocol type, i.e. the first value of the EtherCAT type, which is different from the second value, may be used to indicate the locking of telegram processing for the slave subscribers of a segment.

An unlocker for an automation network is also proposed, wherein the unlocker is embodied to carry out a method for transmitting data and to use a data structure in the method. The unlocker may be advantageously used as a link between the individual segments with slave subscribers, and not be part of the individual segments. Nevertheless, the slave subscribers may also be arranged in a linear chain and have a plurality of unlockers in between, wherein the unlockers themselves may be part of a segment of slave subscribers. The unlockers may also be embodied as network distributors and have a plurality of input/output ports to which separate segments with slave subscribers are connected. It is also conceivable that another input/output port of the unlockers embodied as network distributors is set accordingly, so that the unlockers embodied as network distributors may be part of a segment and may work as slaves, as well as comprise separate segments with slaves at the a plurality of input/output ports. In particular, it is conceivable to use a plurality of unlockers in the automation network which may act as slave subscribers and/or as network distributors.

For example, an EtherCAT network may be divided up into segments in such a way that the first slave subscriber in a segment is assigned a position of zero. This is because when a slave subscriber is switched on, it usually does not have an address, but is initialized by the position of the slave subscriber. An EtherCAT telegram has datagrams, each of them containing a datagram-header section, wherein the datagram-header section contains an address field. The address field has a value which is incremented by each slave subscriber in the EtherCAT network. With the value zero of the address field, which corresponds to the above position zero of the first slave subscriber in a segment, the corresponding slave subscriber knows that no slave subscriber preceding the corresponding slave subscriber is able to increment the value of the address field. Consequently, the first slave subscriber in the segment recognizes via the value zero that the first slave subscriber is addressed as such. In particular, the EtherCAT network may be divided up into segments if an unlocker embodied as a network distributor comprises more than two slave subscribers of a segment at one input/output port and one further input/output port of the a plurality of input/output ports of the unlocker embodied as a network distributor. In this case, independent segments with slave subscribers may be formed at each of the plurality of input/output ports, except for the input/output port and the further input/output port.

The advantageous and further embodiments of the proposal explained above and/or indicated in the sub-claims may be applied individually or in any combination with each other, except for example in cases of clear dependencies or incompatible alternatives.

Figure 1:
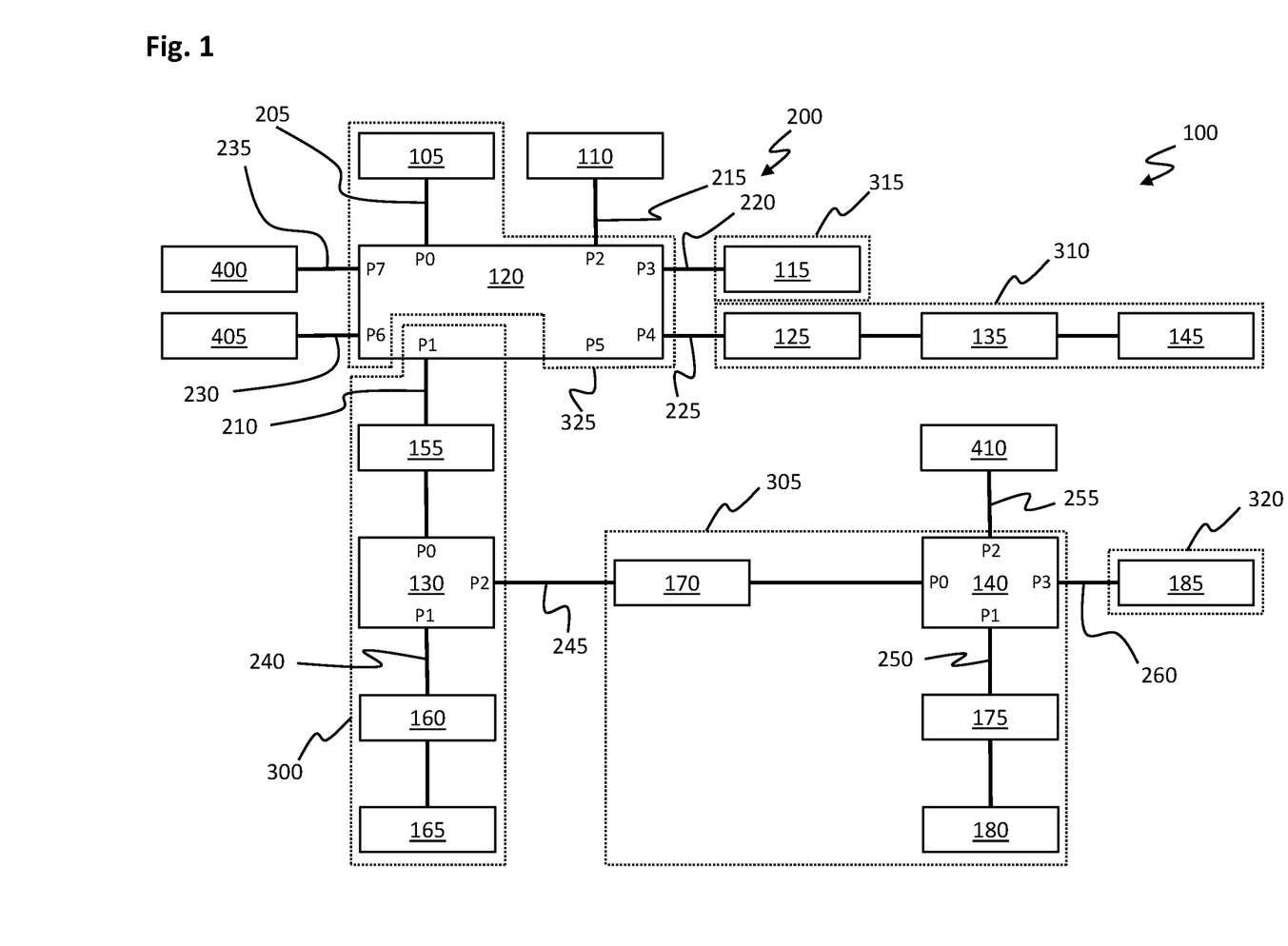
FIG. 1 shows a schematic structure of an automation network in which a method for transmitting data is carried out.

FIG. 1 shows a schematic structure of an automation network 100 in which a method for transmitting data is carried out. The automation network 100 comprises a master subscriber 105 and a plurality of slave subscribers connected to each other via a data-line network 200. The master subscriber 105 is connected to a first input/output port P0 of a first unlocker 120 via a first data line 205 and may form a sixth segment 325. The first unlocker 120 may be connected to another master subscriber 110 via a third input/output port P2 via a third data line 215. In this context, only e.g. the master subscriber 105 connected to the first input/output port P0 of the first unlocker 120 via the first data line 205 may be embodied to carry out a central configuration of the automation network 100.

The first unlocker 120 may be connected to a fourth segment 315 of the automation network 100 via a fourth input/output port P3 of the first unlocker 120 and a fourth data line 220. For example, the fourth segment 315 may comprise a first slave subscriber 115. For better clarity, only the input/output ports of the unlockers are shown in FIG. 1. Nevertheless, the other subscribers in the automation network 100 have input/output ports by which the subscribers are connected to each other via the data-line network 200. This aspect will not be discussed in the following. The first slave subscriber 115 may e.g. be used as coupler element EK1100 manufactured by Beckhoff Automation GmbH & Co. KG and may be embodied to realize data communication with a first data transmission rate of 100 Mbit/s or a first symbol rate of 100 Mbaud. The fourth segment 315 may be exemplarily embodied as described. Furthermore, it is conceivable that the fourth segment 315 deviates from the described embodiment and comprises a plurality of slave subscribers.

The first unlocker 120 may be connected to a third segment 310 of the automation network 100 via a fifth input/output port P4 of the first unlocker 120 and a fifth data line 225. The third segment 310 may include a second slave subscriber 125, a third slave subscriber 135 and a fourth slave subscriber 145. The second slave subscriber 125 may e.g. be embodied as a coupler element. The third slave subscriber 135 may e.g. be embodied as a simple branch, wherein the simple branch may be embodied to have routing functionality in addition to the protocol used in the data-transmission procedure and to support other protocols, such as the TCP/IP protocol (Transmission Control Protocol/Internet Protocol).

The fourth slave subscriber 145 may e.g. be embodied as a simple branch, as well. The first to fourth slave subscribers 125, 135, 145 in the third segment 310 may likewise be embodied to implement a data communication with a second data transmission rate of 1 Gbit/s or with a second symbol rate of 1 Gbaud. In contrast to the fourth segment 315, the third segment 310 may be operated with the second data-transmission rate of 1 Gbit/s instead of the first data-transmission rate of 100 Mbit/s.

For example, a sixth input/output port P5 of the first unlocker 120 cannot have a data line with one or more slave subscribers connected to it. In this context, the sixth input/output port P5 has been chosen as an example. It is furthermore conceivable that another input/output port of the first unlocker 120 is embodied in this way.

The first unlocker 120 is connected to a second network subscriber 405 via a seventh input/output port P6 and a sixth data line 230. The second network subscriber 405 may not be a slave subscriber but an Ethernet subscriber which only processes the Ethernet protocol. In this context, it is conceivable that the second network subscriber 405 does not form an independent segment in the automation network. For example, the second network subscriber 405 is embodied to implement the data communication with the second data transmission rate of 1 Gbit/s.

The first unlocker 120 may be connected to a first network subscriber 400 via an eighth input/output port P7 and a seventh data line 235. The first network subscriber 400 may also be embodied to process the Ethernet protocol and may be an Ethernet subscriber. For example, the Ethernet subscriber may be embodied to implement the data communication with the first data transfer rate of 100 Mbit/s. Just like the second network subscriber 405, the first network subscriber 400 cannot form an independent segment in the automation network 100.

For example, the first unlocker 120 may be part of the sixth segment 325. Via a second input/output port P1 and a second data line 210, the first unlocker 120 may e.g. be connected to a fifth slave subscriber 155. The fifth slave subscriber 155 may e.g. be embodied for data communication at the second data transmission rate. The fifth slave subscriber 155 may be connected to a first input/output port P0 of a second unlocker 130 via the second data line 210.

The second unlocker 130 may be connected to a sixth slave subscriber 160 via a second input/output port P1 of the second unlocker 130 and an eighth data line 240. For example, the sixth slave subscriber 160 may also be a simple branch as mentioned above. Furthermore, the sixth slave subscriber 160 may have a seventh slave subscriber 165 on the eighth data line 240. The seventh slave subscriber 165 may form the last slave subscriber in a first segment 300 which extends from the second input/output port P1 of the first unlocker 120 to the seventh slave subscriber 165, since the slave subscribers in the individual segments are usually arranged in a chain. Furthermore, the seventh slave unit 165 may be embodied as a coupler element. For example, the second unlocker 130 may be part of the first segment 300, provided that the second input/output port P1 of the second unlocker 130 is set for this purpose.

The first segment 300, starting with the second input/output port P1 of the first unlocker 120, the fifth slave subscriber 155, the second unlocker 130, the sixth slave subscriber 160, and the seventh slave subscriber 165 may be embodied for data communication at the second data transmission rate of 1 Gbps, since the fifth slave subscriber 155, the sixth slave subscriber 160, and the seventh slave subscriber 165 are e.g. embodied in such a way. However, it is also conceivable that the fifth slave subscriber 155, the sixth slave subscriber 160, and the seventh slave subscriber 165 as well as the first unlocker 120 and the second unlocker 130 are capable of implementing both the second data-transmission rate at 1 Gbit/s and the first data-transmission rate at 100 Mbit/s. In this context, the first segment 300 may include additional slave subscribers not shown herein, which are embodied to implement the first data transmission rate. In the described case, the data-transmission rate for the subscribers of the first segment 300 may be set to the first data transmission rate. This likewise applies to the other segments; they may also have further slave subscribers that are embodied to implement only the first data-transmission rate. However, this property is not referred to again for the description of the other segments.

The second unlocker 130 is connected to an eighth slave subscriber 170 via a third input/output port P2 and a ninth data line 245. The eighth slave subscriber 170 is the first slave subscriber in a second segment 305. For example, the eighth slave subscriber 170 may be embodied to communicate data at the second data rate. The eighth slave subscriber 170 is also connected to a first input/output port P0 of a third unlocker 140 via the eighth data line 240. The third unlocker 140 may be part of the second segment 305. The third unlocker 140 may be connected to a third network node 410 via a third input/output port P2 and an eleventh data line 255. For example, the third network subscriber 410 is embodied as an Ethernet switch that processes the Ethernet protocol. In the automation network 100, the third network subscriber 410 as well as the first and second network subscribers 400, 405 may not form an independent segment of the automation network 100, since e.g. only network subscribers that process the EtherCAT-data-transfer protocol are intended for this purpose.

The third unlocker 140 may be connected to an eleventh slave subscriber 185 of a fifth segment 320 of the automation network 100 via a fourth input/output port P3 and a twelfth data line 260. For example, the eleventh slave subscriber 185 may be embodied to implement the first data-transfer rate. The third unlocker 140 may be connected to a ninth slave subscriber 175 via a second input/output port P1 and a tenth data line 250. The ninth slave subscriber 175 may be part of the second segment 305 and may be embodied as a coupler element. The ninth slave subscriber 175 may be embodied for the conversion of the second data-transmission rate. A tenth slave subscriber 180 may follow to the ninth slave subscriber 175 via the tenth data line 250. The tenth slave subscriber 180 may e.g. be the last slave subscriber of the slave subscribers arranged in a chain in the second segment 305.

For example, the automation network 100 shown in FIG. 1 may have a tree structure, with the master subscriber 105 forming a root of the tree structure and the individual slave subscribers and unlockers arranged in segments acting as branches of the tree structure. The automation network 100 may in particular be embodied as an EtherCAT network, i.e. data communication may take place by the real-time capable EtherCAT protocol. In this context, the shown segments represent EtherCAT segments, wherein the first to third network subscribers 400, 405, 410, respectively, are not an EtherCAT segment since the first to third network subscribers 400, 405, 410 are e.g. not embodied for processing the EtherCAT protocol.

The master subscriber 105 may be embodied to send a configuration telegram to the first unlocker 120 via the first data line 205 in order to show the first unlocker 120 a telegram identifier of a segment which is assigned to the first unlocker 120. The assignment of the telegram identifier of a segment to the corresponding input/output port of the first unlocker 120, which is used by the first unlocker 120 to output the locked or unlocked telegram, may be stored e.g. in a memory unit of the first unlocker 120 not shown in FIG. 1. It is also conceivable that the assignment of the individual input/output ports of the first unlocker 120 to the respective telegram identifiers of the segments is already stored in the storage unit of the first unlocker 120. At the same time, the master subscriber 105 may use the configuration telegram to set the first unlocker 120, for example, how the first unlocker 120 should proceed when the first unlocker 120 receives a telegram that is locked for processing, hereinafter referred to as a locked telegram, having a telegram ID via the first input/output port P0. The master subscriber 105 may send the configuration telegram for setting purposes prior to the actual telegram traffic in the control mode of the automation network 100.

If the master subscriber 105 sends a locked telegram with a telegram identifier via the first data line 205 to the first unlocker 120, the first unlocker 120 checks upon receipt of the locked telegram by the telegram identifier whether the locked telegram is intended for the segment assigned to the first unlocker 120. In addition, the first unlocker 120 may use the respective telegram identifier to route the locked telegram through the individual input/output ports of the first unlocker 120. The telegram identifier may e.g. be realized as a segment address which may be used to address the individual segments. If e.g. the telegram identifier of the locked telegram sent by the master subscriber 105 is assigned to the first segment 300, the first unlocker 120 may assign the first segment 300 which may be addressed with the telegram identifier to the second input/output port P1 of the first unlocker 120 based on the setting carried out by the configuration telegram.

For the structuring of the automation network 100 into segments, which are formed in an EtherCAT network as EtherCAT segments, various configurations are conceivable. For example, an EtherCAT segment may start at an input/output port of an unlocker embodied as a network distributor via which only slave subscribers are attached. For example, such an EtherCAT segment may extend over the second slave subscriber 125, the third slave subscriber 135 and the fourth slave subscriber 145 and include the third segment 310. Such an EtherCAT segment may also extend over the first slave subscriber 115, i.e. the fourth segment 315. Another example of an EtherCAT segment embodied in such a way is the fifth segment 320 comprising the eleventh slave subscriber 185.

Further an EtherCAT segment may begin at an input/output port of an unlocker embodied as a network distributor via which slave subscribers as well as further unlockers, which may be embodied as slave subscribers, are connected, wherein a further input/output port then has to be set for the further unlocker embodied as slave subscribers. For example, an EtherCAT segment embodied in such a way may include the fifth slave subscriber 155, the second unlocker 130 (provided that the second input/output port P1 of the second unlocker 130 is set accordingly), the sixth slave subscriber 160 and the seventh slave subscriber 165, i.e. it may correspond to the first segment 300. According to another example, the EtherCAT segment may include the eighth protocol network subscriber 170, the third unlocker 140, which may be embodied as a slave subscriber, and a second input/output port P1 set in such a way, the ninth slave subscriber 175 as well as the tenth protocol network subscriber 180. Accordingly, the EtherCAT segment may be embodied as the second segment 305.

Furthermore, an EtherCAT segment may start at the master subscriber 105 and end at the next unlocker. For example the EtherCAT segment may cover the master subscriber 105 as well as the first unlocker 120 and be implemented as the sixth segment 325.

Before the first unlocker 120 outputs the locked telegram with the telegram identifier of the first segment 300, which may e.g. include the symbol a, via the second input/output port P1 of the first unlocker 120, it may have been set by the configuration telegram that the first unlocker 120 sets a data field of the telegram which comprises a data element with a first value to a second value in order to indicate to the slave subscribers in the first segment 300 that the processing of the telegram, hereinafter referred to as unlocked telegram, has been enabled. Moreover, it is conceivable that the first unlocker 120 has already unlocked the locked telegram after receiving the locked telegram via the first input/output port P0 of the first unlocker 120. The fifth slave subscriber 155 may e.g. read the output data of the unlocked telegram with the telegram identifier a of the first segment 300 addressed to it in passing and place its input data into the unlocked telegram which is forwarded by the fifth slave subscriber 155 to the second unlocker 130 via the second data line 210 and received by the second unlocker 130 on the first input/output port P0.

After the second unlocker 130 has read the output data of the unlocked telegram with the telegram identifier a of the first segment 300 addressed to it "on the fly" and has placed its input data into the unlocked telegram, the second unlocker 130 may forward the unlocked telegram via the second input/output port P1 to the sixth slave subscriber 160 via the eighth data line 240. This requires that the second input/output port P1 of the second unlocker 130 is set accordingly so that the second unlocker 130 may process the unlocked telegram with the telegram identifier a of the first segment 300 as a slave subscriber. The sixth slave subscriber 160 may read analogously addressed output data and place input data into the unlocked telegram and forward the unlocked telegram to the seventh slave subscriber 165 via the eighth data line. The seventh slave subscriber 165 likewise reads the output data addressed to it and inserts input data into the unlocked telegram accordingly. Furthermore, the seventh slave subscriber 165 recognizes that after it, no further slave subscriber is connected to the eighth data line 240. For example, for this purpose an input/output port of the seventh slave subscriber 165 may be short-circuited with a switch that the seventh slave subscriber 165 may include, and the seventh slave subscriber 165 may be set in such a way that the seventh slave subscriber 165 then sends the unlocked telegram to the second unlocker 130 via the eighth data line 240. The second unlocker 130 may be set so that the second unlocker 130 sends the unlocked telegram to the first unlocker 120 via the second data line 210. The first unlocker 120 may be configured in such a way that the first unlocker 120 sends the unlocked telegram from the seventh slave subscriber 165 back to the master subscriber via the first data line 205.

The first unlocker 120 and the second unlocker 130 may each be configured as slave subscribers to process the telegram from the master subscriber 105. In addition to the above description, the first unlocker 120 may also be embodied to process the unlocked telegram in addition to the feature that the first unlocker 120 unlocks the locked telegram sent by the master subscriber 105 by setting the first value of the data element of the telegram to the second value. This similarly applies to the third unlocker 140 because the third unlocker 140, too, may be embodied as a slave subscriber and may be configured to process unlocked telegrams.

Furthermore, the first to third unlocker 120, 130, 140 may be embodied as network distributors and use the telegram identifier for routing the telegram through the individual input/output ports of the first to third unlockers 120, 130, 140. In connection with the telegram identifier used for the routing, the fourth segment 315 and/or the third segment 310 connected to the fourth input/output port P3 and/or the fifth input/output port P4 of the first unlocker 120 may in particular each form an independent segment and not correspond to the segment in which the first unlocker 120 itself is arranged. The first unlocker 120 forms the sixth segment 325 together with the master subscriber 105. Alternatively, the first unlocker 120 may also be a part of the first segment 300.

In context with the telegram identifier used for routing, the second segment 305 connected to the third input/output port P2 of the second unlocker 130 may in particular be an independent segment and not correspond to the segment in which the second unlocker 130 itself is arranged. Furthermore, in connection with the telegram identifier used for routing, the fifth segment 320 connected to the fourth input/output port P3 of the third unlocker 140 may in particular be an independent segment and not correspond to the segment in which the third unlocker 140 itself is arranged. In the embodiment shown in FIG. 1, for example, the second unlocker 130 and the third unlocker 140 are part of the first segment 300 and of the second segment 305, respectively, since the second input/output ports P1 may each be set for this purpose. The first unlocker 120 is e.g. located in the sixth segment 325. Apart from that, the first unlocker 120 may also be part of the first segment 300, provided that the second input/output port P1 of the first unlocker 120 is set accordingly. Alternatively, it is also conceivable that the second unlocker 130 as well as the third unlocker 140 each form a separate segment. Moreover, the first to third unlockers 120, 130, 140 may be embodied in such a way that the first to third unlockers 120, 130, 140 are not part of a segment, but individual segments may be connected to their input/output ports.

When receiving a locked telegram with a telegram identifier assigned to a segment of the first unlocker 120, wherein the segment may e.g. be a separate segment at an input/output port of the first unlocker 120, the first unlocker 120 may use the telegram identifier for routing the locked telegram via the assigned input/output port of the first unlocker 120 stored in the storage unit. Before that, the first unlocker 120 may release the locked telegram for processing by the slave subscribers by setting the first value of the data element to the second value. The first unlocker 120 may furthermore use a locked telegram with a telegram identifier that is not assigned to a segment of the first unlocker 120 but is e.g. assigned to the first segment 300 in which the second unlocker 130 is located, to use the telegram identifier for routing the locked telegram. For example, based on the stored assignment of the telegram identifier with the symbol b to the second segment 305 and via the input/output port to be routed in the process, the first unlocker 120 uses the second input/output port P1 of the first unlocker 120.

For example, the first unlocker 120 passes the locked telegram with the telegram ID b to the fifth slave subscriber 155 in an unchanged manner via the second input/output port P1 of the first unlocker 120 via the second data line 210. The fifth slave subscriber 155 reads a header section of the locked telegram with the telegram ID b on the fly up to the data field which contains the data element with the first value. Based on the first value, the fifth slave subscriber 155 recognizes that the fifth slave subscriber 155 is not intended to process the user data of the locked telegram and sends the locked telegram to the second unlocker 130 via the second data line 210. The second unlocker 130 receives the locked telegram having the telegram identifier b via the first input/output port P0 and recognizes on the basis of the telegram identifier b and the stored assignment in the memory unit that the input/output port of the second unlocker 130 assigned to the telegram identifier b and the second segment 305 for outputting the telegram is the third input/output port P2 of the second unlocker 130. Prior to outputting the locked telegram via the third input/output port P2, the second unlocker 130 unlocks the locked telegram by setting the first value of the data element to the second value to indicate to the eighth slave subscriber 170 that the processing of the telegram is enabled when the unlocked telegram is output via the third input/output port P2 and the ninth data line 245.

The eighth slave subscriber 170 reads the output data of the telegram addressed to it, i.e. the user data, on the fly and places its input data into the unlocked telegram before the eighth slave subscriber 170 forwards the unlocked telegram to the third unlocker 140 via the ninth data line 245. The third unlocker 140 may be equally addressed by the unlocked telegram due to the fact that the third unlocker 140 may be embodied as a slave subscriber like the first and second unlockers 120, 130, if the second input/output port P1 is set for it. For example, the second input/output port P1 of the third unlocker 140 is set accordingly and the third unlocker 140 may thus operate as a slave subscriber. In this case, the third unlocker 140 reads the output data addressed to it in the telegram while passing mode and puts its input data into the unlocked telegram before the third unlocker 140 outputs the unlocked telegram via the second input/output port P1 of the third unlocker 140 assigned to the telegram identifier of the second segment 305 via the tenth data line 250.

The ninth slave subscriber 175 receives the unlocked telegram via the tenth data line 250, reads the telegram output data addressed to it, places its input data into the unlocked telegram and sends the unlocked telegram via the tenth data line 250 to the tenth slave subscriber 180. The tenth slave subscriber 180 also reads the output data addressed to it from the unlocked telegram on the fly and places its input data into the unlocked telegram. In addition, the tenth slave subscriber 180 recognizes that it is the last slave subscriber in the chain of slave subscribers in the second segment 305. The tenth slave subscriber 180 may e.g. also detect this via a further input/output port of the tenth slave subscriber 180 short-circuited by a switch, as explained above.

The tenth slave subscriber 180 sends the unlocked telegram back to the ninth slave subscriber 175 via the tenth data line 250, and the ninth slave subscriber 175 sends the unlocked telegram to the second input/output port P1 of the third unlocker 140 via the tenth data line 250. The third unlocker 140 outputs the unlocked telegram via the first I/O port P0 to the eighth slave subscriber 170 via the ninth data line 245, and the eighth slave subscriber 170 sends the unlocked telegram to the second unlocker 130 via the ninth data line 245. The second unlocker 130 receives the unlocked telegram via the third I/O port P2. For example, the second unlocker 130 may be set in such a way that when the second unlocker 130 receives an unlocked telegram from a preceding unlocker, e.g. the third unlocker 140, which is not intended for the first segment 300 assigned to the second unlocker 130 based on the telegram ID b, the second unlocker 130 locks the unlocked telegram by setting the second value of the data element to the first value, thus preventing a possible processing of the unlocked telegram on the way back to the master subscriber 105.

The third unlocker 130 outputs the locked telegram to the fifth slave subscriber 155 via the first input/output port P0 via the second data line 210. The fifth slave subscriber 155 cannot process the locked telegram and sends the locked telegram to the first unlocker 120 via the second data line 210. The first unlocker 120 receives the locked telegram on the second input/output port P1 and may, for example, be embodied to unlock the locked telegram by the telegram identifier b, i.e. to set the first value of the data element to the second value of the data element before the first unlocker 120 outputs the telegram via the first input/output port P0 to the master subscriber 105 via the first data line 205.

The examples for explaining the telegram traffic from the master subscriber 105 to the slave subscribers of the first and second segments 300, 305, or, respectively, from the slave subscribers in the two segments back to the master subscriber 105 have been exemplarily chosen and do not limit the telegram traffic to these exemplary examples. The same explanation could have been given for the telegram traffic from master subscriber 105 to another segment of the automation network 100.

An EtherCAT network usually comprises a data-line network 200 with data lines, each of which having a forward line e.g. embodied as a TX line for sending telegrams from the master subscriber 105 to the slave subscribers, and a return line e.g. embodied as an RX line for receiving telegrams from the master subscriber 105 (TX: transmitter, RX: receiver). This is not shown in FIG. 1 for reasons of clarity. A slave subscriber in an EtherCAT network is embodied to process an unlocked telegram on the forward line, i.e. to read the output data of the unlocked telegram addressed to the slave subscriber and to put the input data of the slave subscriber into the unlocked telegram. In the EtherCAT network the telegrams are sent back via the return line, wherein the slave subscribers do not process the unlocked telegram via the return line. Alternatively, it is also conceivable that unlocked telegrams may be processed by the slave subscribers on the way back to the master subscriber.

For example, the second unlocker 130 may be set so that when the second unlocker 130 receives an unlocked telegram having the telegram identifier c via a forward line from a preceding unlocker, for example the first unlocker 120, the second unlocker 130 sends the unlocked telegram with the telegram identifier c back to the master subscriber 105 via the return line. The first data line 205 and the second data line 210 may in this context each have a forward and a return line and the unlocked telegram may e.g. have been processed by the first unlocker 120 on the forward line. Processing of the unlocked telegram on the return line is then no longer provided in an EtherCAT network. However, in an alternatively embodied automation network it may be possible for the slave subscribers to process an unlocked telegram on the return line.

The default setting of the second unlocker 130 may e.g. be achieved by a configuration telegram sent by the master subscriber 105 to the second unlocker 130 before the telegrams were sent. For example, the configuration telegram in the storage unit of the second unlocker 130 may be used to set that if the second unlocker 130 receives an unlocked telegram with a specific telegram identifier, for example in the form of the symbol c, via the forward line and the unlocked telegram has the second value of the data element, the second unlocker 130 sends the unlocked telegram back to the master subscriber 105 via the return line. It is also possible to use the configuration telegram in case of an available data line for sending and receiving telegrams in the second unlocker 130 to set that if the second unlocker 130 receives an unlocked telegram with a specific telegram identifier, for example in the form of the symbol b, which does not correspond to the segment assigned to the second unlocker 130, i.e. it is e.g. not assigned to the first segment 300 with the telegram identifier a but to the second segment 305, and the unlocked telegram has the second value of the data element, the second unlocker 130 sets the second value of the data element to the first value of the data element in order to lock the telegram for processing by the slave subscribers. This is particularly conceivable if processing of the telegram by the slave subscribers on the way back to the master subscriber 105 is not excluded. In this manner, the confidentiality of data transmission in the automation network 100 may be increased.

For the above description, the second unlocker 130 has been chosen as an example. However, it is not limited to the described features; any unlocker of the automation network 100 is equally suitable for this purpose.

The individual input/output ports of the unlockers on which the unlockers have respectively received a telegram from the master subscriber 105 may be stored in the memory unit of the unlocker by the respective unlocker in order to use the first input/output port P0 of the corresponding unlocker assigned to the master subscriber 105 as the output port when the telegrams are sent back from the unlocker.

Figure 2:
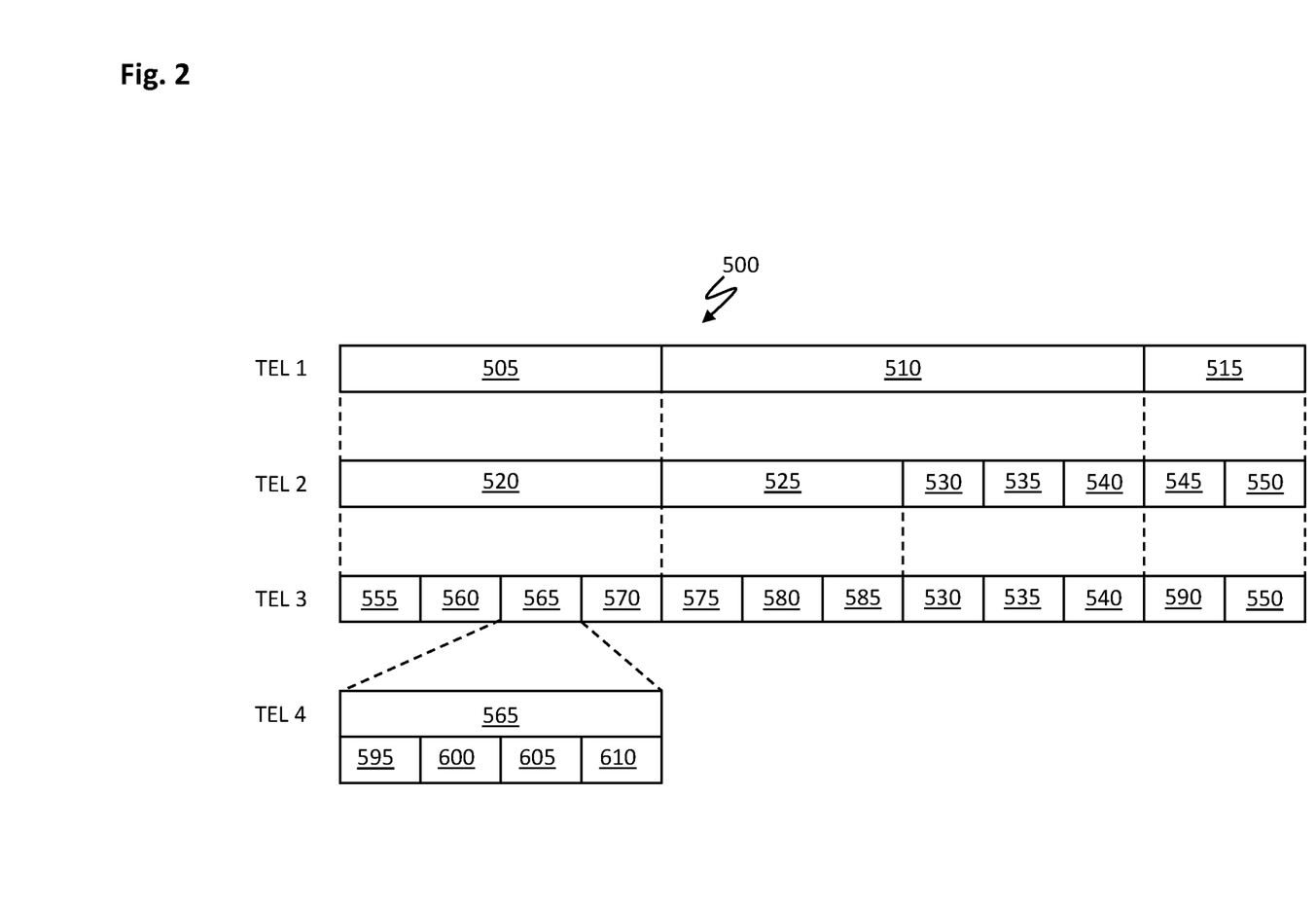
FIG. 2 depicts a schematic first to fourth telegram structure for a data structure used in the method for transmitting data in the automation network of FIG. 1.

FIG. 2 shows a schematic diagram of a data structure 500 for use in the data-transmission method in the automation network 100 of FIG. 1. The data structure 500 is embodied as a telegram that is e.g. output by the master subscriber 105 in FIG. 1 to the slave subscribers in the automation network 100 for processing for the purpose of control operations. The data structure 500 in FIG. 2 has a first telegram structure TEL1 and comprises a header section 505, a data section 510 and an end section 515. The data structure 500 may e.g. be embodied according to the IEEE standard 802.3 and include the Ethernet-data-frame format for packet-oriented data transmission. If the EtherCAT-data-transfer protocol for data structure 500 is embodied for processing user data of data structure 500 in addition to the Ethernet-data-frame format, the data structure has a second telegram structure TEL2. The header section 505 of the data structure 500 is then embodied as Ethernet-header section 520.

The data section 510 of the data structure 500 then has an EtherCAT-header section 525 comprising instructions for the slave subscribers. Furthermore the data section 510 comprises EtherCAT data, which may be implemented in the form of datagrams. For example, the data section 510 may have a first datagram 530, a second datagram 535 and an nth datagram 540, wherein the nth datagram 540 indicates that the data structure 500 may comprise any number of datagrams. At this point, however, no limitation to a certain number of datagrams in the data structure 500 shall be made. The datagrams themselves each comprise a control-data field and a user-data field not shown in FIG. 2. The control-data field comprises a command field which informs the slave subscriber about the way in which the slave subscriber is to process the user data of the data structure 500 embodied as an EtherCAT telegram: for example, whether the slave subscriber should insert data into the user-data field of the EtherCAT telegram in a write operation, or whether the slave subscriber should first extract data from the user-data field and then insert them into the user-data field in a read/write operation, or, respectively, whether the slave subscriber should only extract data from the user-data field in a read operation. The control-data field also has an address field. The address field defines the data area in the slave subscriber with which the slave subscriber is to exchange data through the user-data field passes through.

After receiving the control-data field in the datagram of the EtherCAT telegram, the slave subscriber starts to evaluate the command field and the address field. If the slave subscriber is addressed via the data element for the processing the EtherCAT telegram, the slave subscriber extracts the output data intended for it from the user-data field during a read or, respectively, a read/write datagram while the datagram passes through the slave subscriber in the EtherCAT telegram. If the datagram is a write or a read/write datagram, the corresponding slave subscriber inserts the input data into the user-data field in the datagram.

The end section 515 of the EtherCAT telegram data structure 500, in the following referred to as EtherCAT telegram, also has a padding field 545 and a checksum field 550 in the second telegram structure TEL2. The padding field 545 is necessary to bring the EtherCAT telegram in the Ethernet data frame to the required minimum size of the Ethernet data frame of 64 bytes by inserting additional bytes added as pad into the EtherCAT telegram. The padding field may be required if the EtherCAT telegram contains less than 46 or 42 bytes (without or with an IEEE-802.1Q compliant VLAN tag), not counting a preamble and a Start Frame Delimiter (SFD) field which are not included in FIG. 2. The checksum field 550 may be used to ensure the integrity of sent data. For example, the checksum field 550 may include a calculated Cyclic Redundancy Check (CRC) checksum calculated via the Ethernet data frame, starting with a target Media Access Control (MAC) address and ending with padding field 545 so that the checksum itself is not included in the CRC checksum. The CRC checksum is created by the sender and appended to padding field 545. After receiving the EtherCAT telegram, the receiver performs the same CRC checksum calculation and if the CRC checksum calculated by the receiver does not match the CRC checksum transmitted with the EtherCAT telegram, the receiver assumes a faulty data transmission. In such a case, the EtherCAT telegram may be rejected by the receiver.

A third telegram structure TEL3 of FIG. 2 shows a more detailed structure of the Ethernet-header section 520. The Ethernet-header section 520 has a target-address field 555, which includes the above mentioned target-MAC address which identifies the network subscriber, which may be a slave subscriber, an unlocker or a master subscriber in the automation network 100 of FIG. 1, that is to receive the EtherCAT telegram. The target MAC address may also be a multicast address (addressing a plurality of network subscribers in automation network 100) or a broadcast address (addressing all network subscribers in automation network 100). Following the target-address field 555, the Ethernet-header section 520 has a sender-address field 560. The sender-address field 560 comprises a sender address, which is also embodied as a MAC address and identifies the sender. The target-address field 555 and the sender-address field 560 each contain 6 bytes.

Furthermore, the Ethernet-header section 520 has a TAG field 565 following the sender-address field 560. This may e.g. be embodied as a VLAN TAG field (VLAN: Virtual Local Area Net-work) in accordance with the IEEE 802.1Q standard and comprise 4 bytes. Following the TAG field 565, the Ethernet-header section 520 has a protocol field 570. The protocol field 570 may be embodied as a so-called "Ethertype" field and may comprise a value that specifies a used protocol of a next higher layer within the user data, wherein one layer and a next higher layer are defined according to the OSI model (OSI: Open Systems Interconnection), i.e. the reference model for transmitting data protocols in a layer architecture. For example, the protocol field 570 has the value 0x88A4 (in hexadecimal system) if the telegram is embodied as an EtherCAT telegram, this value being linked to the real-time capable EtherCAT-data-transmission protocol.

The EtherCAT-header section 525 contains a length field 575. The length field 575 informs about the length of the EtherCAT datagrams. Following the length field 575, the EtherCAT-header section 525 comprises a reserve field 580 for a special case of need. Following the reserve field 580, the EtherCAT-header section 525 comprises a type field 585 which has the data element with the first and the second value, the data element being embodied as EtherCAT-protocol type. The EtherCAT-protocol type includes the second value, if the segment addressed with the telegram identifier with slave subscribers is addressed for processing. The EtherCAT-protocol type then has the value 0x1 (in hexadecimal system) and the slave subscribers in the segment recognize by this value that the EtherCAT telegram is released for processing and start processing the datagrams in the EtherCAT telegram.

The EtherCAT-protocol type has the first value which is different from the second value with 0×1 (in hexadecimal system), for example the first value may correspond to 0×6 (in hexadecimal system) if the EtherCAT telegram is locked for processing by the slave subscribers in the respective segment. The telegram identifier may e.g. be embodied as MAC address of the target-address field 555. Furthermore, the telegram identifier may also be a VLAN ID when using TAG field 565, which may be a VLAN TAG field. The VLAN-TAG field may contain 4 bytes, i.e. 32 bits, with the first two bytes containing the value 0x8100 to identify the Ethernet data frame as a tagged Ethernet-data frame according to the IEEE 802.1Q standard. The remaining two bytes contain the VLAN ID, a fragmentation information in case of the EtherCAT telegram being fragmented, and a priority with which the EtherCAT telegram may be sent, wherein the priority may be in the form of a priority value. The individual datagrams of the third telegram structure TEL3 are not discussed again herein since they may be identical to the datagrams of the second telegram structure TEL2.

The end section 515 may contain a fragmentation field 590 instead of the padding field 545 if the EtherCAT telegram is fragmented by an unlocker which is e.g. embodied as a network distributor or a so-called "branch". The fragmentation field 590 may comprise the value zero to indicate that no fragmentation of the EtherCAT telegram has occurred. The bits zero to three of the fragmentation field 590 may comprise a data-frame number indicating a value which is used to mark the respective Ethernet data frame, wherein bits zero to three may be used to represent values from one to 15 if the EtherCAT telegram has been fragmented by an unlocker. The bits 4 to 7 of the fragmentation field 590 may be used as reserve bits.

The TAG field 565 may also be structured according to a fourth telegram structure TEL4. FIG. 2 does not show a representation of the other fields of the Ethernet-header section 520, the EtherCAT-header section 525 and the end section 515 shown in the third telegram structure TEL3. Nevertheless the fourth telegram structure TEL4 may be a complete EtherCAT telegram. The TAG field 565 may have a protocol-identification field 595 following the fourth telegram structure TEL4. For example, the protocol identification field 595 may have a value that identifies the Ethernet-data frame as a tagged Ethernet data frame according to the IEEE 802.1Q standard, but is embodied differently from the VLAN tag with the value 0x8100 (in hexadecimal system).

Following the protocol identification field 595, the TAG field 565 may comprise a first data field 600. Moreover, the TAG field 565 may have a second data field 605 between the first data field 600 and a third data field 610. The first data field 600 and the second data field 605 may also contain the telegram identifier of the EtherCAT telegrams which assign the EtherCAT telegrams to the individual segments of the automation network 100 shown in FIG. 1. In this context, the telegram identifier for an EtherCAT telegram may e.g. comprise a target-segment address and a sender-segment address, wherein the first data field 600 may contain the target-segment address and the second data field 605 may contain the sender segment address. The third data field 610 may comprise an unoccupied area, e.g. bit zero to bit 11 of the third data field 605 may serve as reserve bits. Furthermore, the third data field 610 may contain the fragmentation information as explained above in connection with the VLAN tag, in case the EtherCAT telegram is fragmented, and the priority with which the EtherCAT telegram may be sent.

Furthermore, the EtherCAT telegram may also be embedded in a UDP/IP (UDP: User Datagram Protocol, IP: Internet Protocol) data frame structure, which, however, is not shown in FIG. 2. In this case, the Ethernet-header section 520 has the target-address field 555 and the sender-address field 560. Following the sender-address field 560, the Ethernet-header section 520 includes the protocol field 570, wherein the protocol field 570 has the value 0x0800 (in hexadecimal), which specifies the Internet Protocol (IPv4, Internet Protocol Version 4). Protocol field 570 is followed by an IP-header section and a UDP header section in the Ethernet-header section 520. The EtherCAT-header section 525, the datagrams and the end section 515 may be embodied in analogy to the above description, wherein the end section 515 may include the padding field 545 as well as the checksum field 550. Furthermore, the EtherCAT telegram may have the TAG field 565 in addition to the embedding in the UDP/IP data-frame structure, wherein the TAG field 565 may be a VLAN tag. The TAG field 565 is then arranged analogously to the third telegram structure TEL3.

Figure 3:
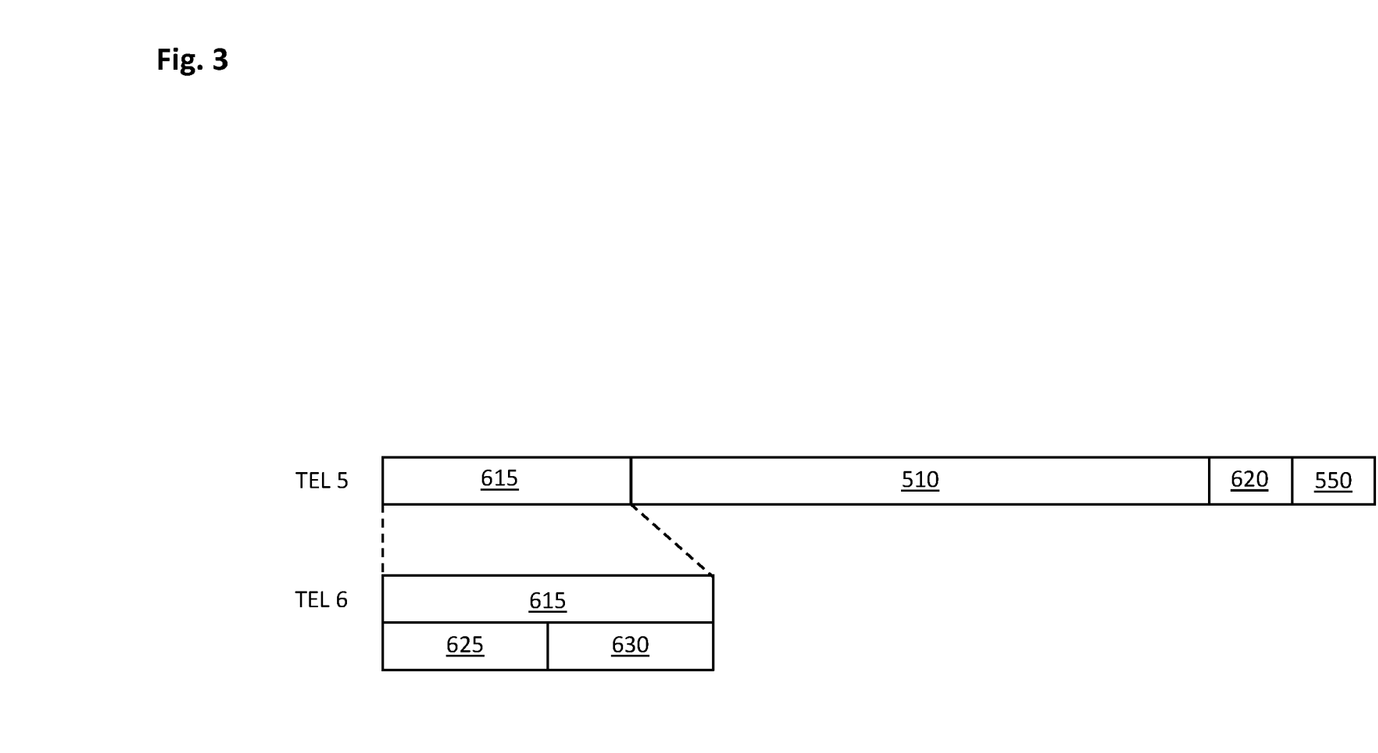
FIG. 3 shows a schematic fifth and sixth telegram structure for the data structure of FIG. 2.

FIG. 3 shows a schematic fifth and sixth telegram structure TEL5, TEL6 for the data structure 500 of FIG. 2, which may be embodied as EtherCAT telegram. In particular the EtherCAT telegram may comprise the fifth telegram structure TEL5 and the sixth telegram structure TEL6, if the EtherCAT telegram has been fragmented by an unlocker in the automation network 100 shown in FIG. 1 and a first fragment of the fragmented EtherCAT telegram e.g. comprises the third and fourth telegram structure TEL3, TEL4. A second to nth fragment of the EtherCAT telegram may have the fifth and sixth telegram structure TEL5, TEL6. The EtherCAT telegram has a fragment-target-address field 615, where the fragment target-address field 615 comprises a fifth data field 625 and a sixth data field 630 according to the sixth telegram structure TELE. For example, the fifth data field 625 of the fragment-target-address field 615 may comprise 4 bytes and be in the form of a multicat-address space, the multicat-address space having multicast addresses which serve to address a plurality of segments with slave subscribers in the automation network 100 shown in FIG. 1. Alternatively, the multicat-address space may be configured in the form of a multicat-address space, the multicat-address space having unicast addresses which serve to address a single segment with slave subscribers in FIG. 1. Furthermore, the multicat-address space may also be in the form of a multicat-address space, the multicat-address space comprising broadcast addresses used for addressing all segments with slave subscribers in FIG. 1.

The sixth data field 630 of the fragment-target-address field 615 may contain 2 bytes. Bits zero to three of the sixth data field 630 may include the data-frame number which may indicate the value of the respective Ethernet-data frame. Bits 4 to 7, as well as bit 12, may also be reserve bits and have no assignment. Bits 8 to 11 may contain a fragment number indicating the value of the respective fragment to assign the individual fragments to the assigned Ethernet-data frame. Furthermore, bits 13 to 15 may have the priority with which the second to nth fragment of the EtherCAT telegram may be sent, wherein the priority may be in the form of a priority value. The data section 510 in the fifth telegram structure TEL5 has been chosen as an example and may be formed according to the second and third telegram structure TEL2, TEL3 of FIG. 2. Following data section 510, the second to nth fragment of the EtherCAT telegram may comprise a fourth data field 620 which may contain one byte. Bits 0 to 3 of the fourth data field 620 may be used to indicate whether a further fragment follows or whether the fragment to be transmitted is already the last fragment of the EtherCAT telegram. For example the value zero may be used to indicate that the fragment to be transmitted is the last fragment of the EtherCAT telegram. Furthermore, bits 4 to 6 may be provided as reserve bits and bit 7 for filling up the second to nth fragment of the EtherCAT telegram with filling bytes, i.e. padding, if the length of the fragment falls below the minimum length. Furthermore, the second byte of the fourth data field 620 may indicate the data-frame number which may indicate the value of the respective Ethernet data frame. Finally, the second to nth fragment of the EtherCAT telegram according to the fifth telegram structure TEL5 may include the checksum field 550 with the checksum calculated by the second to nth fragment, which may be embodied analogously to the above explanation. Since the fourth data field 620 and the checksum field 550 together comprise 5 bytes, the fragment-target-address field 615 and the data section 510 of the second to nth fragment of the EtherCAT telegram may in sum have at least 59 bytes without padding being required for the second to nth fragment of the EtherCAT telegram to reach the minimum length of 64 bytes.

The structure of the EtherCAT telegram does not necessarily have to include the order of the slave subscribers in the segments, because the EtherCAT telegrams may address physical memory addresses, in the following referred to as physical address region, of the slave subscribers in the segments on the one hand and on the other hand the Ether-CAT telegrams may also be embodied as logical telegrams. In the second case a logical address, i.e. a logical address region, and a length of the address range may be specified in the EtherCAT telegram. In particular, a logical address region may be larger than a physical address region, so that the physical address region may be put into the logical address region. Furthermore, the logical address region may be placed one after the other in the EtherCAT telegram.

The invention was described in detail in context with preferred embodiment examples. Instead of the described embodiment examples, further embodiment examples are conceivable which may show further modifications or combinations of described features. For this reason, the invention is not restricted by the disclosed examples as a person of skill in the art may devise variations therefrom without exceeding the protective scope of the invention.

TABLE 1

List of References: 100-410

100 automation network
105 master subscribers
110 further master subscribers
115 first slave subscriber
120 first unlocker TABLE 1-continued List of References: 100-410

125 second slave subscriber
130 second unlocker
135 third slave subscriber
140 third unlocker
145 fourth slave subscriber
155 fifth slave subscriber
160 sixth slave subscriber
165 seventh slave subscriber
170 eighth slave subscriber
175 ninth slave subscriber
180 tenth slave subscriber
185 eleventh slave subscriber
200 data-line network
205 first data line
210 second data line
215 third data line
220 fourth data line
225 fifth data line
230 sixth data line
235 seventh data line
240 eighth data line
245 ninth data line
250 tenth data line
255 eleventh data line
260 twelfth data line
300 first segment
305 second segment
310 third segment
315 fourth segment
320 fifth segment
325 sixth segment
400 first network subscribers
405 second network subscriber
410 third network subscriber

TABLE 2

List of References: 500 to 620 et al.

500 data structure
505 header section
510 data section
515 end section
520 Ethernet-header section
525 EtherCAT-header section
530 first datagram
535 second datagram
540 nth datagram
545 padding field
550 checksum field
555 target-address field
560 sender-address field
565 TAG field
570 protocol field
600 first data field
605 second data field
610 third data field
615 fragment-target-address field
620 fourth data field
P0 first input/output port
P1 second input/output port
P2 third input/output port
P3 fourth input/output port
P4 fifth input/output port
P5 sixth input/output port
P6 seventh input/output port
P7 eighth input/output port
TEL1 first telegram structure
TEL2 second telegram structure
TEL3 third telegram structure
TEL4 fourth telegram structure
TEL5 fifth telegram structure
M Covering face
R Rotation axle
S Plane of section TABLE 2-continued List of References: 500 to 620 et al.

X First marked region
α Acute angle

What is claimed is:

1. A method for transmitting data in an automation network by telegrams, wherein the automation network comprises a master subscriber, slave subscribers and at least one unlocker connected to each other via a data-line network,
wherein the slave subscribers are divided up into segments, each segment comprising at least one slave subscriber, wherein the master subscriber sends locked telegrams for processing by the slave subscribers, each telegram having a telegram identifier in order to assign a locked telegram to a segment,
wherein at least one segment is assigned to the at least one unlocker,
wherein, when the at least one unlocker receives a locked telegram, the at least one unlocker checks on the basis of the telegram identifier in the locked telegram whether the locked telegram for the segment assigned to the at least one unlocker is intended to release the locked telegram as an unlocked telegram for processing by the slave subscribers, provided that the locked telegram is intended for the segment assigned to the at least one unlocker, and
wherein the data-line network comprises data connections between the master subscriber, the slave subscribers and a plurality of unlockers,
wherein, when an unlocker receives an unlocked telegram from a preceding unlocker via a data connection, the telegram not being intended for the segment assigned to the unlocker, the unlocker blocks the telegram.

2. The method according to claim 1,
wherein the telegrams each comprise a data field with a data element,
wherein, if the telegrams are locked, the data element comprises a first value,
wherein, if the telegrams are unlocked, the data element has a second value, and
wherein the at least one unlocker, when unlocking an locked telegram, sets the first value of the data element to the second value of the data element in order to indicate to the slave subscribers a releasing of the telegram for processing.

3. The method according to claim 1, wherein the master subscriber sends a configuration telegram to the at least one unlocker before sending the telegrams, the configuration telegram indicating to the at least one unlocker the telegram identifier of the segment which is assigned to the at least one unlocker.

4. The method according to claim 1,
wherein the data-line network comprises data connections between the master subscriber, the slave subscribers and a plurality of unlockers, wherein the data connections each comprise a forward line and a return line,
wherein the slave subscribers process the telegrams on the forward line of the data connection,
wherein, when an unlocker receives an unlocked telegram from a preceding unlocker via a forward line of the data connection, the unlocker sends the unlocked telegram to the master subscriber via a return line of the data connection.

5. The method according to claim 1,
wherein the at least one unlocker is configured as a network distributor and comprises a plurality of input/output ports to which segments comprising slave subscribers are connected, and
wherein the at least one unlocker configured as a network distributor uses the telegram identifier for routing the telegram via the plurality of input/output ports of the at least one unlocker configured as a network distributor.

6. The method according to claim 1, wherein the at least one unlocker is additionally configured as a slave subscriber to also process the telegram.

7. The method according to claim 1,
wherein each telegram comprises a header section, a data section and an end section,
wherein the header section comprises the telegram identifier,
wherein the data section comprises the data field with the data element,
wherein, if the telegram is locked, the data element comprises the first value,
wherein, when the telegram is unlocked, the data element comprises the second value, and
wherein the end section comprises a checksum field for an integrity check of transmitted data.

8. The method according to claim 1,
wherein each telegram is configured as an Ethernet telegram having a target-address field and a sender-address field in the header section,
wherein the target-address field and the sender-address field are each formed as MAC-address field,
wherein the header section comprises a TAG field having the telegram identifier, and
wherein the header section comprises a protocol field for a protocol in use.

9. The method according to claim 1,
wherein each telegram is configured as an EtherCAT telegram,
wherein the data section comprises a further head section,
wherein the further header section comprises a length field, a reserve field and the data field,
wherein the data field is formed as a type field and the data element is configured as an EtherCAT-protocol type.

10. An automation network,
wherein the automation network comprises a master subscriber, slave subscribers and at least one unlocker connected to each other via a data-line network,
wherein the slave subscribers are divided up into segments, each segment comprising at least one slave subscriber, wherein the master subscriber is configured to send telegrams locked for processing by the slave subscribers, each telegram having a telegram identifier for assigning a locked telegram to a segment,
wherein at least one segment is assigned to the at least one unlocker,
wherein the at least one unlocker is configured, if the at least one unlocker receives a locked telegram, to check on the basis of the telegram identifier in the locked telegram whether the locked telegram for the segment assigned to the at least one unlocker is intended to release the locked telegram as an unlocked telegram for processing by the slave subscribers, provided that the locked telegram is intended for the segment assigned to the at least one unlocker, and
wherein the data-line network comprises data connections between the master subscriber, the slave subscribers and a plurality of unlockers, wherein an unlocker is configured, if the unlocker receives an unlocked telegram from a preceding unlocker over a data connection, the telegram not being intended for the segment assigned to the unlocker, to lock the telegram.

11. The automation network according to claim 10,
wherein the master subscriber is configured to send telegrams to the slave subscribers,
wherein a telegram sent by the master subscriber comprises a data field with a data element,
wherein the master subscriber is configured to lock the telegram by the master subscriber setting the data element of the telegram to a first value, and
wherein the at least one unlocker is configured, if a locked telegram is unlocked, to set the first value of the data element to a second value of the data element in order to indicate to the slave subscribers a releasing of the telegram for processing.

12. The automation network according to claim 10,
wherein the data-line network comprises data connections between the master subscriber, the slave subscribers and a plurality of unlockers, wherein the data connections each comprise a forward line and a return line,
wherein the slave subscribers are configured to process the telegrams on the forward line of the data connection,
wherein an unlocker is configured, if the unlocker receives an unlocked telegram via a forward line of a data connection, to send the unlocked telegram to the master subscriber via a return line of the data connection.

13. The automation network according to claim 10,
wherein the at least one unlocker is configured as a network distributor and is configured to have a tof input/output ports to which segments having slave subscribers are connected, and
wherein the at least one unlocker configured as a network distributor is configured to use the telegram identifier for routing the telegram via the plurality of input/output ports of the at least one configured as a network distributor.

14. The automation network according to claim 10, wherein the at least one unlocker is additionally configured as a slave subscriber to also process the telegram.

15. An unlocker configured for operation in an automation network,
wherein the unlocker comprises a plurality of input/output ports to which segments comprising slave subscribers are connected via a data connection, wherein the slave subscribers are divided up into the respective segments, wherein at least one of the segments is assigned to the unlocker,
wherein when the unlocker receives a locked telegram via one of the plurality of input/output ports over the data connection, the unlocker checks on the basis of a telegram identifier in the locked telegram whether the locked telegram for the segment assigned to the unlocker is intended to release the locked telegram as an unlocked telegram for processing by the slave subscribers, provided that the locked telegram is intended for the segment assigned to the unlocker, and
wherein the unlocker is configured, if the unlocker receives an unlocked telegram from a preceding unlocker over a data connection, the telegram not being intended for the segment assigned to the unlocker, to lock the telegram.

16. The unlocker according to claim 15,
wherein a telegram comprises a data field with a data element,
wherein the telegram is locked by setting the data element of the telegram to a first value, and
wherein the unlocker is configured, if a locked telegram is unlocked, to set the first value of the data element to a second value of the data element in order to indicate to the slave subscribers a releasing of the telegram for processing.

17. The unlocker according to claim 15,
wherein the unlocker is configured as a network distributor, and
wherein the unlocker configured as a network distributor is configured to use the telegram identifier for routing the telegram via the plurality of input/output ports of the unlocker configured as a network distributor.

18. The unlocker according to claim 15, wherein the unlocker is additionally configured as a slave subscriber to also process the telegram.

* * * * *